United States Patent [19]

Püschel et al.

[11] 4,242,435
[45] Dec. 30, 1980

[54] PHOTOGRAPHIC DYE DIFFUSION TRANSFER PROCESS

[75] Inventors: Walter Püschel, Leverkusen; Hans Vetter, Cologne; Paul Marx, Leverkusen, all of Fed. Rep. of Germany

[73] Assignee: AGFA-Gevaert, A.G., Leverkusen, Fed. Rep. of Germany

[21] Appl. No.: 10,512

[22] Filed: Feb. 9, 1979

[30] Foreign Application Priority Data

Feb. 14, 1978 [DE] Fed. Rep. of Germany ....... 2806196

[51] Int. Cl.³ .......................... G03C 5/54; G03C 7/00; G03C 1/40; G03C 1/10
[52] U.S. Cl. .................................. 430/242; 430/222; 430/223; 430/241; 430/562
[58] Field of Search ............................ 96/290, 77, 99; 430/242, 223, 241, 222, 562

[56] References Cited

U.S. PATENT DOCUMENTS 3,954,476 5/1976 Krutak et al. ............................ 96/77

OTHER PUBLICATIONS

Research Disclosure, No. 15654, Apr. 1977, pp. 32-39.

Primary Examiner—Richard L. Schilling

Attorney, Agent, or Firm—Connolly & Hutz

[57] ABSTRACT

For the production of cyan and magenta images by the dye diffusion transfer process dye-providing compounds of the formula I are suitable

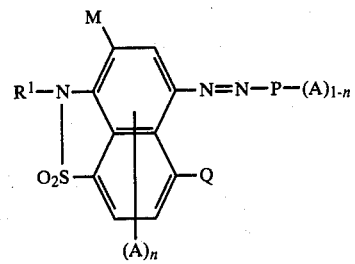

in which
  $A$ = an oxydizable carrier residue containing a diffusion-preventing radical;
  $n$ = 0 or 1;
  $P$ = a monocyclic aromatic radical;
  $M$ = hydrogen, halogen, alkyl sulfonyl, aryl sulfonyl or sulfamoyl;
  $Q$ = acylamino;
  $R^1$ = hydrogen or a hydrolyzable radical.

2 Claims, No Drawings

PHOTOGRAPHIC DYE DIFFUSION TRANSFER PROCESS

This invention relates to a process for the production of color photographic images by the dye diffusion transfer process and to a photographic material suitable for use in this process containing new non-diffusible dye-providing compounds which release diffusable cyan or magenta naphthsultamazo dyes.

Among conventional processes for the production of colored photographic images by the dye diffusion transfer process, recent years have seen an increase in importance of those processes which are based on the use of dye-providing compounds incorporated in non-diffusible form from which diffusible dyes or dye precursor products are released imagewise during development and transferred to an image-receiving layer.

Dye-providing compounds suitable for use in processes of this type include, for example, the non-diffusible color couplers described in German Pat. No. 1,095,115 which during development release a preformed dye or a dye produced during color coupling in diffusible form in consequence of a reaction with the oxidation product of a color developer compound consisting of a primary aromatic amine. In this case, the choice of the developer compound required is of course confined to color developers.

In addition, German Offenlegungsschrift No. 1,930,215 describes non-diffusible dye-providing compounds which contain a preformed, latently diffusible dye residue attached to a diffusion-preventing residue through a cleavable hydrazone group. These compounds cannot be called color couplers in the true sense and it has also been found that the choice of the developer compounds which are required for releasing the diffusible dye residue is by no means confined to conventional color developers; instead, black-and-white developers, for example pyrocatechols, can also be successfully used.

In addition, German Offenlegungsschrift No. 1,772,929 describes non-diffusible dye-providing compounds containing a particular group which, during development, enter into an oxidative ring-closing reaction and, in doing so, release a preformed dye residue in diffusible form. The compounds in question may be divided into two groups. The compounds of one group require for development a conventional color developer compound with whose oxidation product they couple and, in a following ring-closing reaction, release the preformed dye residue in diffusible form. The compounds of the other group are silver halide developers and, accordingly, are able even in the absence of further developer compounds in the oxidized form to enter into the above mentioned ring-closing reaction by which the diffusible dyes are released.

Finally, reference is made at this juncture to the non-diffusible dye-providing compounds described in German Offenlegungsschrift No. 2,242,762. The compounds in question are sulfonamido phenols and sulfonamido anilines which are split after oxidation during development under the influence of the developer alkali, releasing diffusible dyes containing a free sulfamoyl group ($-SO_2NH_2$).

The dye-providing compounds mentioned above all work negatively; in other words, where conventional (negative) silver halide emulsions are used the diffusible dye released is distributed imagewise in consistency with the negative silver image produced during development. Accordingly, to produce positive dye images, it is necessary to use direct-positive silver halide emulsions or alternatively to apply a suitable reversal process. In addition, German Offenlegungsschriften Nos. 2,402,900 and 2,543,902 describe non-diffusible dye-providing compounds which are capable of entering into a splitting reaction under alkaline developing conditions, resulting in the release of a diffusible dye, but which on the other hand in oxidized form complicate or prevent the above-mentioned splitting reaction. Compounds such as these are suitable for the production of positive transfer dye images in combination with conventional negative emulsions.

It is difficult to select from the range of hitherto known dye-providing compounds suitable representatives which are satisfactory in every respect, i.e. on the one hand in regard to adequate reactivity and, on the other hand, in regard to adequate stability. They should not release the diffusible dyes immediately during the alkaline development step, but only after a certain amount of them has been oxidized imagewise by the imagewise developed silver halide.

On the other hand, the diffusible dyes should be released sufficiently quickly either from the oxidized form or from the non-oxidized form of the dye-providing compounds, in addition to which rapid transfer of the diffusible dyes is necessary.

It is very important for the dyes to be able to be anchored to a sufficient extent in the image-receiving layer and to show excellent spectral properties coupled with outstanding stability against light and heat.

It has been found that the diffusible dyes released from the known dye-providing compounds frequently show unsatisfactory light fastness after diffusion into the image-receiving layer and anchorage on the mordant. In addition, the spectral properties and, in particular, the position of the absorption maximum and the width at half of maximum intensity of the absorption band (a measure of the clearness of the dyes) are also unsatisfactory in many cases.

Accordingly, an object of the present invention is to provide new dye-providing compounds for the dye diffusion transfer process which, during photographic development, release diffusible cyan or magenta dyes with improved fastness to light and improved spectral properties.

The present invention provides a photographic dye diffusion transfer process for the production of colored images, in which a photographic material comprising at least one photosensitive silver halide emulsion layer and, associated therewith, a non-diffusible dye-providing compound is exposed imagewise and developed with a silver halide developer, a diffusible dye being released imagewise from the non-diffusible dye-providing compound by the developer alkali and being transferred to an image-receiving layer. In the process of the present invention the non-diffusible dye-providing compound used is a compound corresponding to the following formula (I):

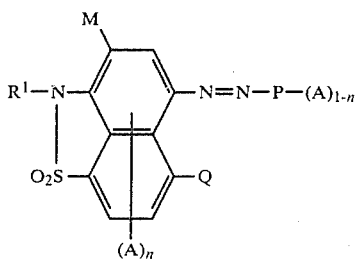

in which:

A represents an oxidizable organic carrier radical attached to the remainder of the formula optionally through a connecting link X and containing a diffusion-preventing radical, of which carrier radical either in its oxidized form or in its non-oxidized form at least a part thereof is split off together with the diffusion-preventing radical under the alkaline conditions of the photographic development process, accompanied by the imagewise release of a diffusible azo dye corresponding to the general formula (II):

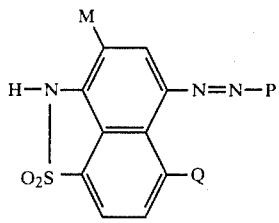

in which either the naphthsultam radical or the radical P is modified in relation to formula (I) to the extent that this radical carries that part of the carrier radical, optionally including the bridging member X, which is left after removal of the diffusion-preventing radical, n=0 or 1, P represents a monocyclic carbocyclic aromatic or heterocyclic aromatic radical, M represents hydrogen, halogen, alkyl sulfonyl, aryl sulfonyl or sulfamoyl, Q represents acylamino, the acyl radical being derived from aliphatic or aromatic carboxylic of sulfonic acids, including carbonic acid mono esters, carbamic acids and sulfamic acids.

$R^1$ represents hydrogen or a hydrolysable radical corresponding to one of the formulae—CO—$R^2$ or —CO—$OR^2$, and $R^2$ represents alkyl containing from 1 to 18 carbon atoms or phenyl.

Examples of heterocyclic aromatic radicals which may be represented by P are the 3-phenyl-1,2,4-thiadiazole radical attached to the azo group through its 5-position, the 1,3-thiazole radical optionally containing a nitro group and attached through its 2-position and the 1,2,4-triazole radical attached through its 3-position. In this connection, reference is made to Houben-Weyl, Methoden der Organischen Chemie, Vol. X/3, pages 53 et seq.

Accordingly, the dye-providing compounds according to the invention contain an azo dye residue of formula (II) which carries a diffusion-preventing oxidizable organic carrier radical either on the naphthsultam radical or on the radical P. The nature of this carrier radical is such that it (or at least the main part of it which carries the diffusion-preventing radical) is split off from the dye-providing compound either in oxidized form or in non-oxidized form under the processing conditions, for example by developer alkali or in consequence of an intramolecular rearrangement reaction, so that diffusible naphthsultamazo dyes are released. Carrier radicals A with functions such as these are known. In this connection, reference is made for example to the sulfonamido phenols and sulfonamido anilines described in the above-mentioned German Offenlegungsschrift No. 2,242,762 which, after oxidation during development, are split under the influence of the developer alkali, releasing diffusible dyes containing a free sulfamoyl group. In addition, reference is made for example to the compounds described in German Offenlegungsschriften Nos. 2,505,248 and 2,645,656, for example the 3-sulfonamido indole compounds which, when oxidized are similarly split by the developer alkali and release diffusible dyes. Accordingly, these compounds also provide for dye transfer in zones where development takes place. In addition, reference must be made at this juncture to German Offenlegungsschriften Nos. 2,402,900 and 2,543,902, both of which describe dye-providing compounds which release diffusible dyes from the non-oxidized form in a splitting reaction under alkaline development conditions, but which on the other hand in oxidized form complicate or prevent the above mentioned splitting reaction. Accordingly, compounds such as these only provide for dye transfer essentially in those zones where no oxidation brought about by development has taken place. Accordingly, they are suitable for the production of positive transfer images.

Compounds according to the invention correspond for example to one of formulae (III) to (V) below:

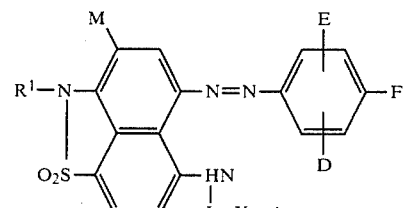

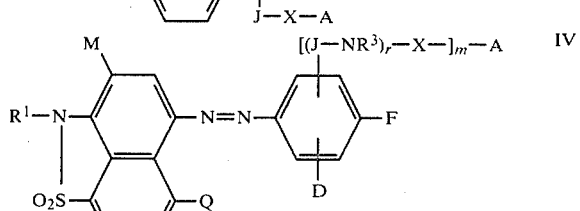

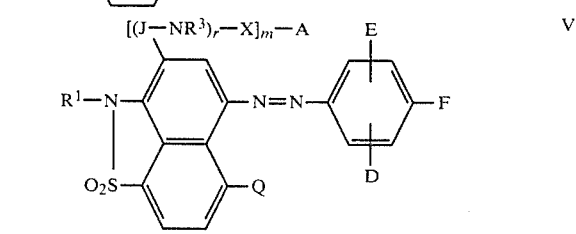

in which A, M, Q and $R^1$ are as defined above and in which

D and E are the same or different and represent hydrogen, halogen, cyano, nitro, trifluoromethyl, alkyl, alkoxy or sulfamoyl, F represents hydrogen, alkyl, alkoxy, halogen, nitro or sulfamoyl, J represents —SO₂— or —CO—, $R^3$ represents hydrogen or alkyl containing from 1 to 6 carbon atoms, X represents a divalent connecting link of the formula —$R^4$—(L)$_p$—($R^4$)$_q$— where $R^4$ is an alkylene radical containing from 1 to 6 carbon atoms or an optionally substituted phenylene radical, the two radicals $R^4$ being the same or different, L represents —O—, —CO—, —CO—$NR^5$—, —SO₂—$NR^5$—, —SO₂—, —SO— or —S— ($R^5$=H or alkyl), m, p, q, r=0 or 1; and q=1 where p=1.

As can be seen from formulae (III) to (V) above, the non-diffusible oxidizable carrier radical may be attached either through the monocyclic aromatic ring (formula IV) or through the naphthsultam ring (formulae III and V). In the latter case, the non-diffusible oxidizable carrier radical is preferably situated in one of the substituents M and Q.

Particularly advantageous compounds of formula (I) and (III)-(V) are compounds in which the radical A represents a radical corresponding to one of the following formulae (VI) to (VIII):

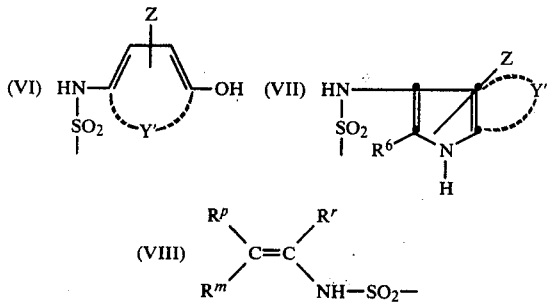

in which

Z represents a diffusion-preventing radical,

Y' represents a radical required to complete a benzene or naphthalene ring,

Y" represents a radical required to complete an optionally substituted fused benzene radical $R^6$ represents hydrogen, alkyl, aryl, a heterocyclic group, carboxyl, carbamoyl or alkoxy carbonyl, $R^m$ represents —$OR^n$ or —$NHR^o$ where $R^n$ represents hydrogen or a radical capable of being hydrolysed under the photographic development conditions, for example an acyl radical derived from an aliphatic or aromatic carboxylic or sulfonic acid, including carbonic acid monoesters and carbamic acid; and $R^o$ represents hydrogen, alkyl, for example methyl, n-butyl or n-octadecyl, aryl, for example phenyl or naphthyl, or acyl, the acyl radical being derived from an aliphatic or aromatic carboxylic acid or sulphonic acid, for example acetyl or p-toluene sulphonyl, $R^p$ represents hydrogen, alkyl containing up to 22 carbon atoms, such as methyl, n-butyl, isopropyl or n-octadecyl, aryl such as phenyl or o-carboxy phenyl, or —$NHR^q$ where $R^q$ represents an alkyl radical, for example methyl, an aryl radical, for example phenyl, or an acyl radical, for example benzoyl or benzene sulphonyl, $R^r$ represents hydrogen, alkyl containing up to 22 carbon atoms, such as methyl, isopropyl, n-butyl or n-octadecyl, aryl, for example phenyl, carboxy phenyl or phenylaminophenyl, cyano, —CO—$NHR^s$ or —CO—$OR^s$ where $R^s$ represents alkyl, such as methyl, or aryl such as phenyl.

Accordingly, in the preferred embodiment of the invention, as exemplified in formulae VI, VII and VIII, A together with the linking —NH—SO₂-group represents a non-diffusible oxidizable organic carrier radical of the type which is only split by the developer alkali in oxidised form. Accordingly, dye diffusion only occurs in those zones of the photographic material where silver halide development takes place.

The divalent bridging member shown in general formulae (III) to (V) may be for example a radical corresponding to one of the following formulae:

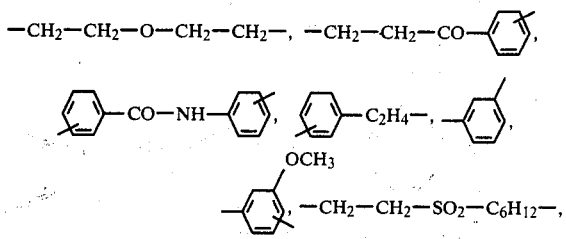

It is pointed out that the dye-providing compounds according to the invention are not intended to diffuse into the layers of the photographic material as intact molecules. To this end, they contain a diffusion-preventing radical, for example the radical Z.

Adequate resistance to diffusion of the dye-providing compounds may prevail even when they do not contain any relatively long alkyl radicals because in that case the molecule may also be sufficiently large, depending upon the dye radical. Otherwise, it is possible to make the dye-providing compounds sufficiently resistant to diffusion by selecting radicals of suitable size.

Diffusion-preventing radicals are radicals which enable the compounds according to the invention to be incorporated in diffusion-resistant form in the hydrophilic colloids normally used in photographic materials. To this end, it is preferred to use organic radicals which generally contain from 8 to 20 carbon atoms and comprise straight-chain or branched-chain aliphatic groups and, optionally, even isocyclic or heterocyclic or aromatic groups.

These radicals are attached to the rest of the molecule either directly or indirectly, for example through one of the following groups: —NHCO—, NHSO₂—, —NR— (where R is hydrogen or alkyl), —O— or —S—. In addition, the diffusion-preventing radical may also contain groups which impart solubility in water, such as for example sulfo groups or carboxyl groups which may even be present in anionic form. Since the diffusion properties depend upon the size of the molecule of the whole compound used, it is even sufficient in certain cases, for example when the whole molecule used is large enough, to use shorter-chain radicals as "diffusion-preventing radicals".

Examples of suitable dye-providing compounds according to the invention are the following compounds in which the following radical was used as the carrier radical A:

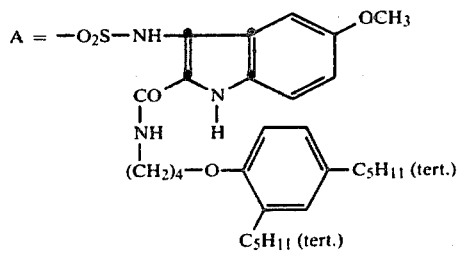

-continued
(8) 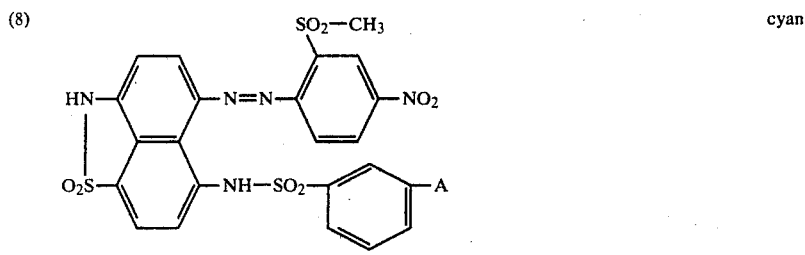 cyan
(9) 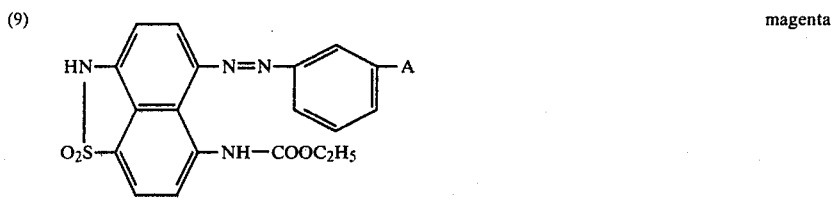 magenta
(10) 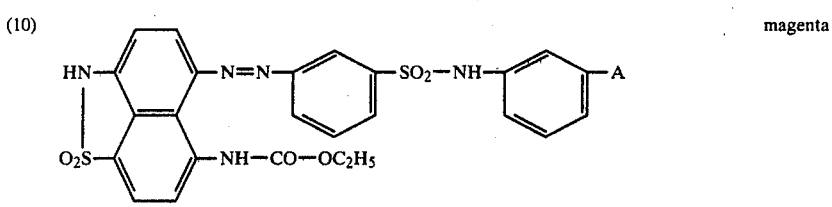 magenta
(11) 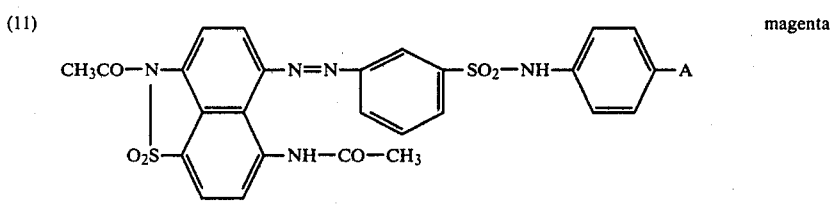 magenta
(12) 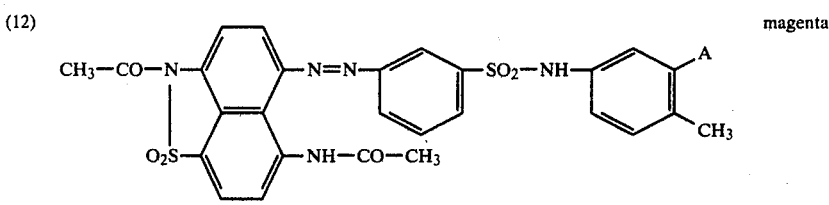 magenta
(13) 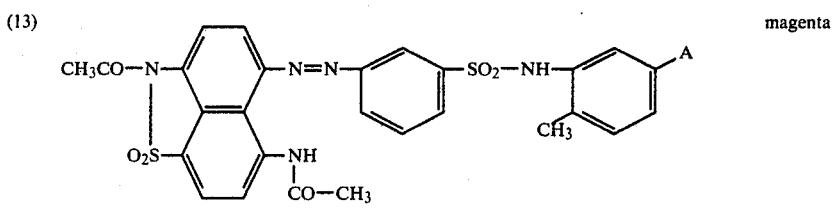 magenta
(14) 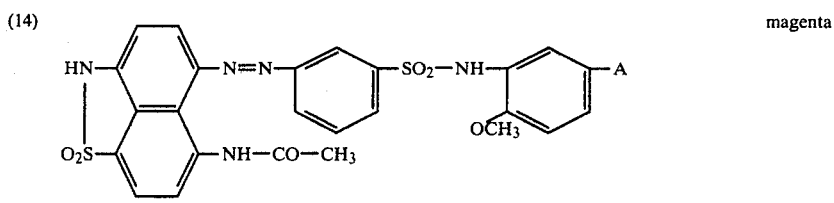 magenta
(15) 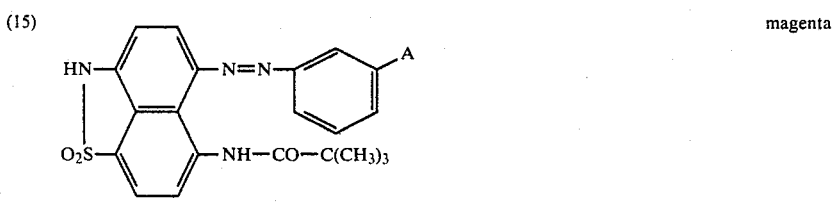 magenta -continued

| | | |
|---|---|---|
| (16) | [naphthalene with HN–, O₂S–, –N=H–C₆H₃–SO₂–NH–C₆H₃(Cl)(A), –NH–CO–CH₃] | magenta |
| (17) | [naphthalene with HN–, O₂S–, –H=N–C₆H₄–SO₂–NH–C₆H₄–A, –NH–CO–C(CH₃)₃] | magenta |
| (18) | [naphthalene with NH–, O₂S–, –H=N–C₆H₅, –SO₂–NH–C₆H₃(OCH₃)(A), –NH–COOC₂H₅] | magenta |
| (19) | [naphthalene with HN–, O₂S–, –N=N–C₆H₃(A)(OCH₃), –NH–COOC₂H₅] | magenta |
| (20) | [naphthalene with HN–, O₂S–, –H=N–C₆H₄–SO₂–HN–C₆H₃(OCH₃)(A), –NH–CO–C(CH₃)₃] | magenta |
| (21) | [naphthalene with HN–, O₂S–, –N=N–C₆H₃(OCH₃)–SO₂–NH–C₆H₃(OCH₃)(A), –NH–COOC₂H₅] | magenta |
| (22) | [naphthalene with HN–, O₂S–, –N=N–C₆H₄–SO₂–NH–C₆H₃(OCH₃)(A), –NH–CO–CH₂–OC₂H₅] | magenta |
| (23) | [naphthalene with HN–, O₂S–, –N=N–C₆H₄–SO₂–NH–C₆H₄–A, –NH–CO–CH₂–OC₂H₅] | magenta |
| (24) | [naphthalene with HN–, O₂S–, –N=N–C₆H₄–SO₂–NH–C₆H₃(OCH₃)(A), –NH–CO–OCH₃] | magenta |

(25) 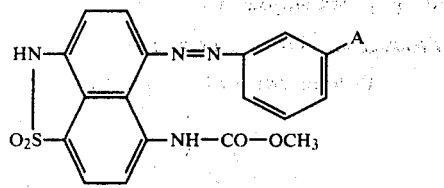 magenta

(26) 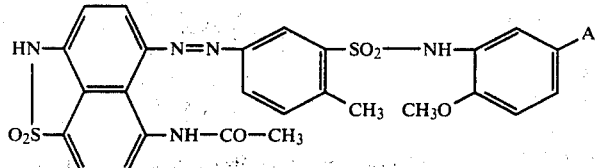 magenta

(27) 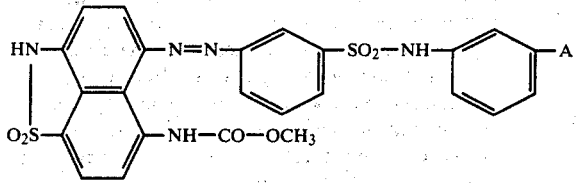 magenta

The dye-providing compounds according to the invention are generally produced from a suitably substituted aniline corresponding to the radical P in general formula (I) above which is diazotised and coupled with a suitably substituted naphthsultam derivative. Preferably either the aniline derivative used or the naphthsultam derivative contains a sulfo group when the coupling reaction is carried out. From the azo dye thus obtained, it is possible, for example by known methods, to produce a sulfochloride derivative which is subsequently reacted with the amino group of a suitable carrier radical.

The production of compounds 1 and 7 is described in detail in the following. The other dye-providing compounds according to the invention may also be similarly produced.

Production of dye-providing compound 1

Production of compound A

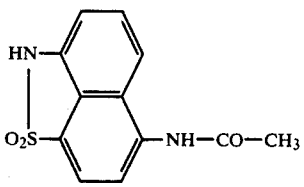  A 48 g of 4-acetoamino-8-amino-1-naphthalene sulfonic acid were stirred into 144 ml of phosphorus oxychloride, 14.4 ml of dimethyl formamide were added dropwise and the mixture was heated with stirring for 1.5 hours to a temperature of 60° C. After cooling, the mixture was poured onto 1500 g of ice and stirred for 3 hours. The precipitate was filtered under suction, the residue was stirred into 100 ml of water, adjusted to pH 7 with concentrated sodium hydroxide, filtered under suction, and the residue was washed with water and dried. Yield: 26.5 g of compound A.

Production of compound C

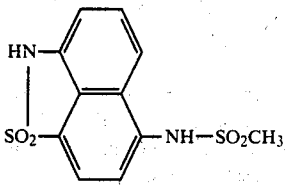  C 27.4 g of the naphthsultam of formula B

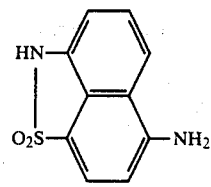  B obtained by the alkaline hydrolysis of compound A were dissolved in 130 ml of pyridine, followed by the dropwise addition over a period of 1 hour at 40° C. of 31.7 ml of methane sulfonic acid chloride. After stirring for 1 hour, 390 ml of water and 40 g of caustic soda were added and the mixture was stirred for 1 hour. The solution was adjusted to pH 6 with hydrochloric acid, the precipitate was filtered under suction and washed with water. The product thus obtained was dissolved in 200 ml of water at pH 10, clarified with active carbon, heated to 70°–80° C. and adjusted to pH 2 by the addition of hydrochloric acid. After cooling, the precipitate was filtered under suction, washed with water and dried. Yield: 20.2 g of compound C.

Production of dye D

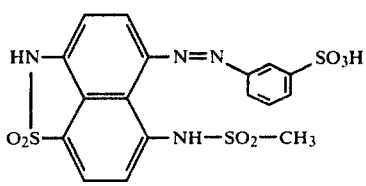

9.1 g of 3-aminobenzene sulfonic acid were stirred with 14.5 ml of hydrochloric acid in 145 ml of water and diazotized in the usual way with 3.6 g of sodium nitrite dissolved in 14.5 ml of water. The diazotised product was quickly added dropwise to a solution of 17.2 g of compound C and 20.5 g of sodium carbonate in 160 ml of water, followed by stirring for 1 hour. 8 g of sodium chloride were then added, the dye precipitated was filtered under suction and washed with 5% sodium chloride solution. The dye was suspended in acetone, filtered under suction, washed with acetone and dried. Yield: 27 g of dye D.

Production of sulfochloride E

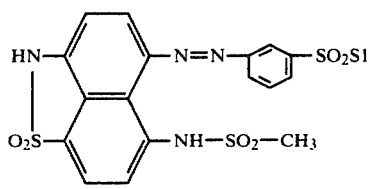

20 ml of dimethyl formamide were added to 27 g of dye D in 135 ml of thionyl chloride, the mixture was stirred for 30 minutes, poured onto ice, filtered under suction, and the residue was washed with water until neutral and dried in air. Yield: 23.8 g of the dye sulfochloride E.

Production of compound 1

7.4 g of the aminoindole compound F

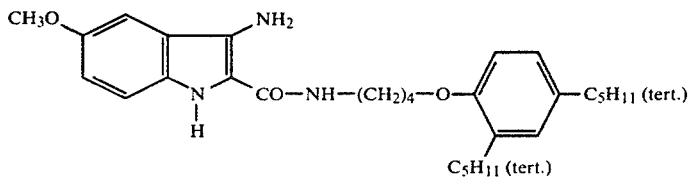

produced by a method described in German Offenlegungsschrift No. 2,645,656, were dissolved in 35 ml of chloroform and 7.5 ml of pyridine, 7.5 g of the dye asulfochloride E were added and the mixture was stirred for 2 hours at room temperature. After boiling under reflux for 15 minutes, 175 ml of methanol were added and the cooled mixture was filtered from a residue. The filtrate was dried and the residue was dispersed in 150 ml of water, filtered under suction, washed with water and dried. The product was stirred into 75 ml of methanol, left standing overnight and the crystallisate was filtered under suction. It was dissolved in a mixture of 20 ml of chloroform and 40 ml of methanol, clarified with kieselguhr, and another 40 ml of methanol were added to the solution which was then left standing overnight to crystallise. The product was filtered under suction, washed with methanol and dried. Yield: 3.8 g of compound 1.

Production of dye-providing compound 7

Production of compound G

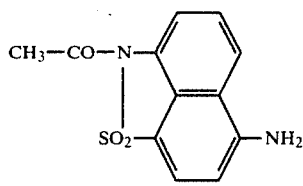

22 g of compound B were dissolved in 220 ml of acetone, followed by the successive addition of 28 ml of triethylamine and 10 ml of acetic anhydride. After stirring overnight, the product was poured into 660 ml of water and the precipitate was filtered under suction. The residue was boiled up in 200 ml of methanol, filtered under suction after cooling, washed with a mixture of equal parts of water and methanol and dried. Yield: 23.8 g of compound G.

Production of compound H

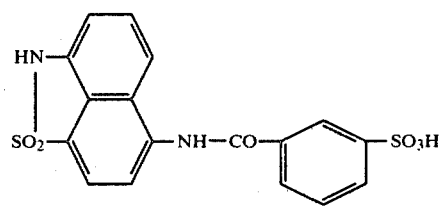

20.2 g of benzoic acid-3-sulfonic acid chloride were boiled under reflux for 5 minutes in 150 ml of pyridine, cooled, 16 g of compound G added and the mixture was stirred overnight. Following the addition of 400 ml of a saturated sodium chloride solution, 150 ml of concentrated hydrochloric acid were added dropwise while cooling, after which the mixture was stirred for 30 minutes, the precipitate was filtered under suction and washed with a saturated sodium chloride solution. The residue was boiled up in 200 ml of water and filtered under suction after cooling. The residue thus obtained was stirred into 200 ml of water, a pH-valve of 12.5 was adjusted by the addition of 5 N NaOH and then maintained until it showed no further change. The solution was adjusted to pH 4 with 5 N hydrochloric acid, filtered from a slight precipitate and 60 g of sodium chloride were added to the filtrate. Following the addition of 25 ml of 20% sodium acetate solution, the mixture was heated to 95° C., left to cool and the crystallisate was filtered under suction. The residue was boiled under reflux for 10 minutes in 50 ml of acetone, 300 ml of acetone were added, the mixture was cooled and the precipitate was filtered under suction. Yield: 14.2 g of compound H.

Production of dye I

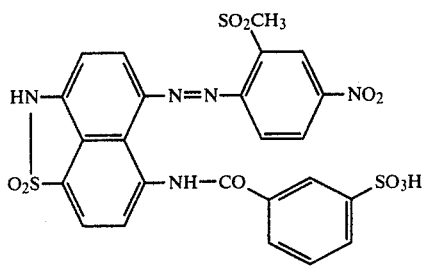

8.2 g of methyl-(5-nitro-2-aminophenyl)-sulfone were diazotised with 6 ml of nitrosyl sulphuric acid in 24 ml of glacial acetic acid at a temperature of 15° C. 17.8 g of compound H were stirred into 180 ml of methanol and the diazotised product was added dropwise over a period of 1 hour at −5° C. After stirring for 3 hours, the precipitate formed was filtered under suction, washed with methanol and dried. 18 g of the compound thus obtained were dissolved in 180 ml of water at pH 12, 10 g of sodium chloride were added, the mixture was stirred for 30 minutes, the precipitate was filtered under suction and then washed with 5% sodium chloride solution. The residue was recrystallised from 150 ml of a 5% sodium chloride solution. Yield: 3.1 g of dye I Production of sulfochloride K

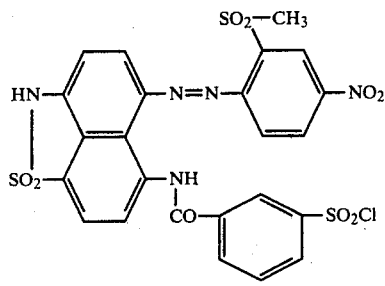

10 g of the dye I were suspended in 50 ml of phosphorous oxychloride, 5 ml of N-methyl pyrrolidone were added dropwise and the mixture was stirred for 1 hour at 60° C. After cooling, 50 ml of chloroform were added and the dye precipitated was filtered under suction, washed with chloroform and dried. Yield: 10.3 g of sulfochloride K.

Production of compound 7

7.4 g of the aminoindole compound F were dissolved with 4.5 ml of pyridine in 75 ml of chloroform, followed by the addition of 9.7 g of compound K. The mixture was stirred for 24 hours at room temperature and then for 15 minutes at reflux temperature, 150 ml of methanol were added, the mixture was cooled and the precipitate was filtered under suction. The residue was heated to boiling point in 200 ml of acetone, 400 ml of water were added dropwise, the mixture was boiled up, cooled, filtered under suction and the residue was washed first with water and then with methanol and dried. Yield: 9.8 g of compound 7.

The other compounds according to the invention may be similarly produced.

The compounds according to the invention are suitable for the dye diffusion transfer process in which they are capable of releasing magenta or cyan image dyes, depending upon the substitution present in the monocyclic carbocyclic radical P in formula (I). The cyan dyes generally contain a nitro group in the p-position of the monocyclic radical. The dye-providing compounds according to the invention are distinguished by very favourable spectral absorption properties and by extreme fastness to light of the image dyes released.

The dye-providing compounds according to the invention are incorporated in the casting solutions for the layers of the photographic material by any of the usual methods. The quantity of dye-providing compound used per liter of casting solution varies within relatively wide limits, the most favourable concentration being determined by simple tests. For example, from 5 to 80 g and preferably from 20 to 40 g of the dye-providing compound are used per liter of casting solution.

The association between non-diffusible dye-providing compound and silver halide which is necessary for obtaining the required effect may be established for example by introducing the non-diffusible compounds into the casting solutions from aqueous solutions using those groups present which impart solubility in water. However, the non-diffusible dye-providing compounds may also be incorporated in the layers by any of the known emulsifying processes. Processes such as these are described for example in British Pat. Nos. 791,219 and 1,099,414 to 1,099,417. It is also possible to prepare aqueous dispersions of the dye-providing compounds and to add them to the particular casting solutions. To this end, aqueous suspensions of the dye-providing compound are finely ground, for example by intensive stirring in the presence of sharp sand or by applying ultrasound. In another embodiment, it may be desirable for example to incorporate the dye-providing compounds together with silver halide and, optionally, developer substances in the layer in the form of so-called microcapsules, in which case two or more differently sensitised photosensitive silver halide emulsions and the corresponding non-diffusible compounds may even be combined in a single layer on the lines of the so-called mixed-grain emulsions, as described for example in U.S. Pat. No. 2,698,794. The non-diffusible dye-providing compounds may be accommodated in a photosensitive layer per se or in an adjacent layer. For example, a compound releasing a cyan dye is associated with the red-sensitive layer, a compound releasing a magenta dye is associated with the green-sensitive layer and a compound releasing a yellow dye is associated with the blue-sensitive layer.

In the context of the invention, the terms "association" and "associated" mean that the mutual arrangement of the silver halide emulsion and the dye-providing compound is of such a nature as to permit an interaction between them which provides for imagewise consistency between the silver image formed and the imagewise distribution of the diffusible dye released. In this connection, the associated dye-providing compound is best incorporated in the silver halide emulsion itself or in a layer adjacent to the silver halide emulsion layer, this adjacent layer preferably lying behind the silver halide emulsion layer (looking in the direction of the incident light during exposure). On development of the silver image, the dye-providing compounds according to the invention are oxidized imagewise by developer oxidation products and are then subjected under the influence of the developer or activator alkali to a splitting reaction in which the dye radicals are released in diffusible form, for example as dye sulfonamides. The usual photographic developer compounds may be used for development, providing they are able in oxidized form to oxidize the dye-providing compounds according to the invention. The following are examples of suitable developers: hydroquinone, N-methyl-aminophenol, 1-phenyl-3-pyrazolidone, 1-phenyl-4,4-dimethyl-3-pyrazolidone, 1-phenyl-4-methyl-4-hydroxymethyl-3-pyrazolidone, aminophenols, N,N-diethyl-p-phenylene diamine, N-ethyl-N-hydroxyethyl-p-phenylene diamine, 3-methyl-N,N-diethyl-p-phenylene diamine, N,N,N',N'-tetraalkyl-p-phenylene diamines, such as tetramethyl-p-phenylene diamine and 1,4-bispyrrolidinobenzene, and reductones.

It is expressly pointed out that the choice of developer substances in the process according to the invention is not confined to color developers; instead, conventional black-and-white developers may also be used, which may be regarded as an advantage by virtue of their minimal tendency towards discoloration. The developers may actually be present in the layers of the color photographic material where they are activated by the alkaline activator liquid, or in the alkaline processing liquid or paste. Since the dye-providing compounds according to the invention themselves show developer properties, there may be no need in some cases to use auxiliary developer compounds. In cases such as these, the dye-providing compound is directly oxidized by developable silver halide.

If the imagewise distribution of the diffusible dye released during development is consistent with the developed silver image, as is the case with the dye-providing compounds of the type described in German Offenlegungsschriften Nos. 2,242,762; 2,505,248 and 1,772,929, direct-positive silver halide emulsions have to be used or, if standard negative emulsions are used, a suitable reversal process has to be applied in order to product positive colored transfer images. In the case of the dye-providing compounds according to DT-OS No. 1,772,929, the diffusible dyes are not directly released as the result of a hydrolytic splitting reaction, but instead as the result of an intramolecular displacement reaction accompanied by ring closure. Neither do the dyes released contain a free sulfonamide group like the dyes released from the dye-providing compounds preferably used in accordance with the invention, but instead a sulfinic acid group. However, the invention is by no means limited to dye-providing compounds of the type in which splitting takes place under the direct influence of alkali.

One such reversal process is available in the silver salt diffusion process. Photographic reversal by the silver salt diffusion process to produce positive colored images using conventional color couplers is described for example in U.S. Pat. No. 2,763,800. By exchanging the color couplers for the above-mentioned dye-providing compounds, it is possible to obtain a photosensitive element which is suitable for the dye diffusion transfer process. A photosensitive element such as this comprises for example at least one combination of a photosensitive silver halide emulsion layer and a binder layer associated therewith which contains development nuclei for the physical development process and a dye-providing compound.

During development, the exposed fraction of the silver halide is chemically developed in the photosensitive silver halide emulsion layer. The unexposed fraction is transferred to the associated binder layer containing development nuclei by means of a silver halide solvent and is physically developed there. Where the developer used for physical development is a developer which, in oxidized form, is capable of releasing a diffusible dye in consequence of a reaction with the dye-providing compound present in this layer, an imagewise distribution of diffusible dyes is formed and may be transferred to an image-receiving layer to form a positive colored image thereon.

Where reversal is carried out with compounds releasing development inhibitors in imagewise distribution, the photosensitive element consists of at least one layer combination of a photosensitive silver halide emulsion layer and a second emulsion layer developable without exposure which contains the dye-providing compound. The photosensitive silver halide emulsion layer is developed for example with color developers in the presence of certain compounds which release development-inhibiting substances on reaction with oxidized color developer. The development-inhibiting substances released imagewise in the photosensitive layer diffuse into the adjacent emulsion layer developable without exposure where they inhibit development imagewise. The uninhibited (positive) parts of the emulsion layer developable without exposure are developed by the remaining developer whose oxidation products then react with the non-diffusible dye-providing compounds according to the invention to release diffusible dyes which are transferred imagewise to the image-receiving element. Suitable compounds which release development-inhibiting substances on reaction with color developer oxidation products are, for example, the known DIR couplers (DIR=development inhibitor releasing) which are color couplers containing a releaseable inhibitor radical in the coupling position. DIR couplers such as these are described for example in U.S. Pat. No. 3,227,554.

Another group of compounds which release development-inhibiting substances on reaction with color developer oxidation products is described in U.S. Pat. No. 3,632,345. These compounds are not color couplers. Accordingly, no dyes are formed on release of the development-inhibiting substances. Finally, according to German Pat. No. 1,229,389, it is also possible in a process of this type to use suitable substituted non-diffusible hydroquinone compounds which, on reaction with developer oxidation products, are oxidized form the corresponding quinones and release development-inhibiting mercaptans.

In principle, suitable direct-positive silver halide emulsions are any direct-positive silver halide emulsions which, when developed under the usual conditions, produce a positive silver image and a corresponding imagewise distribution of developer oxidation products. For example, it is possible to use silver halide emulsions of the type in which exposure or chemical treatment has produced a developable fog which is destroyed imagewise by maintaining certain conditions during exposure to form an image. The fog remains intact in the unexposed areas so that subsequent development results in a direct-positive silver image and, in consistency therewith, in an imagewise distribution of diffusible dye when, for example, a dye-providing compound of that type as described in German Offenlegungsschriften Nos. 2,242,762; 2,505,248; or 2,645,656 is associated with the direct-positive silver halide emulsion.

Another group of direct-positive silver halide emulsions which may be used with advantage in accordance with the invention comprises the so-called unfogged direct-positive silver halide emulsions which are predominantly sensitive to light inside the silver halide grains. When emulsions of this type are exposed imagewise, a latent image is formed predominantly inside the silver halide grains. However, the development of unfogged direct-positive silver halide emulsions of this type is carried out under fogging conditions, a fog being predominantly produced in the unexposed areas and a positive silver image being developed during development. The unfogged direct-positive silver halide emulsions are characterized in that exposed samples developed with a typical surface developer of the following composition:

| | |
|---|---|
| p-hydroxyphenyl glycine | 10 g |
| sodium carbonate (crystallised) | 100 g |
| made up with water to | 1000 ml | preferably produce no silver image at all or only a silver image of very low density, whereas in cases where an internal image developer of the following composition is used:

| | |
|---|---|
| hydroquinone | 15 g |
| monomethyl-p-aminophenol sulfate | 15 g |
| sodium sulfite (anhydrous) | 50 g |
| potassium bromide | 10 g |
| sodium hydroxide | 25 g |
| sodium thiosulfate (crystallised) | 20 g |
| made up with water to | 1000 ml | a silver image with adequate density is formed.

The selective fogging of the unfogged direct-positive emulsions exposed to form an image may be carried out by treatment with a fogging agent either before or during development. Suitable fogging agents are reducing agents, such as hydrazine or substituted hydrazines. In this connection, reference is made for example to U.S. Pat. No. 3,227,552, according to which the fogging agent may even be incorporated in non-diffusible form.

Unfogged direct-positive emulsions are for example emulsions which show faults inside the silver halide grains (U.S. Pat. No. 2,592,250) or silver halide emulsions with a layered grain structure (DT-OS No. 2,308,239).

When dye-providing compounds according to the invention containing a non-diffusible oxidizable carrier radical of the type described in German Offenlegungsschriften Nos. 2,402,900 and 2,543,902 i.e. a carrier radical which is only split by alkali in non-oxidized form, but which complicates or prevents splitting in oxidized form, are used, there is of course no need to use direct-positive emulsions or to apply any reversal processes for producing positive transfer images; instead, standard negative emulsions are sufficient.

A photosensitive element which contains one or more silver halide emulsion layers and the non-diffusible dye-providing compounds associated therewith and an image-receiving element in which the required dye image is produced by the diffusible dyes transferred imagewise may be used for carrying out the dye diffusion transfer process according to the present invention. To this end, the photosensitive element and the image-receiving element have to be in firm contact with one another for a finite period during development so that the image-wise distribution of diffusible dyes produced in the photosensitive element as a result of development can be transferred to the image-receiving element. Contact between the two elements may be established after development has been started or, alternatively, may already have been established before the beginning of development. This is the case where the dye diffusion transfer process is carried out with a material in which the photosensitive element and the image-receiving element form an integral unit (integral transfer material) hereinafter also referred to as a monosheet material, which remains intact even after the development process is over; in other words, the photosensitive element is not separated from the image-receiving element, even after dye transfer. An embodiment such as this is described for example in German Offenlegungsschrift No. 2,019,430.

A monosheet material suitable for carrying out the dye diffusion transfer process according to the present invention comprises for example the following layer elements:
(1) a transparent layer support
(2) an image-receiving element
(3) a light-impermeable layer
(4) a photosensitive element containing at least one photosensitive silver halide emulsion layer and at least one non-diffusible dye-providing compound associated therewith
(5) a retarding layer
(6) an acid polymer layer
(7) a transparent layer support.

The monosheet material may be made up by separately producing two different parts, namely the photosensitive part (layer elements 1 to 4) and the cover sheet (layer elements 5 to 7) which are then placed with their layer sides on one another and are joined together, optionally with spacer strips in between so that a space for accommodating a precisely measured quantity of a working fluid is formed between the two parts. However, the layer elements 5 and 6, which together form the neutralization system, may also be arranged in reversed order between the layer support and the image-receiving layer of the photosensitive part.

Means may be provided for introducing a working fluid between the photosensitive part and the cover sheet, for example in the form of a laterally arranged breakable container which, under the action of mechanical forces, releases its contents between two adjacent layers of the monosheet material.

An important part of the photographic material according to the present invention is the photosensitive element which, in the case of a single dye transfer process, contains a photosensitive silver halide emulsion layer and a non-diffusible dye-providing compound associated therewith. The non-diffusible compound may be accommodated in a layer adjacent the silver halide emulsion layer or in the silver halide emulsion layer itself, in which case the dye of the image dye is preferably selected in such a way that the predominant absorption range of the dye-providing compound does not coincide with the predominant sensitivity range of the silver halide emulsion layer. To produce multicolored transfer images in natural colors, however, the photosensitive element contains three such associations of dye-providing compound and photosensitive silver halide emulsion layer, in which case the absorption range of the dye-providing compound generally coincides to a large extent with the spectral sensitivity range of the associated silver halide emulsion layer. In that case, the dye-providing combination has to be arranged in a separate binder layer behind the silver halide emulsion layer (looking in the direction of the incident light during exposure) in order to obtain as high a sensitivity as possible.

The developer oxidation products formed during the development of a silver halide emulsion should of course only act on the associated dye-providing compound. Accordingly, the photosensitive element generally contains barrier layers which effectively prevent the developer oxidation products from diffusing into other non-associated layers. These barrier layers may contain for example suitable substances which react with the developer oxidation products, for example non-diffusible hydroquinone derivatives or, where the developer is a color developer substance, non-diffusible color couplers. In one preferred embodiment, therefore, the photosensitive element has the following structure (from top to bottom):

a blue-sensitive silver halide emulsion layer,
a layer containing a non-diffusible compound releasing a diffusible yellow dye,
a barrier layer,
a green-sensitised silver halide emulsion layer,
a layer containing a non-diffusible compound releasing a diffusible magenta-dye,
a barrier layer,
a red-sensitised silver halide emulsion layer,
a layer containing a non-diffusible compound releasing a diffusible cyan dye.

The silver halide emulsion layers may of course also be arranged in reverse order, although in that case the associated layers containing the dye-providing compounds must also be interchanged so that the association remains intact.

The light-impermeable layer arranged below the photosensitive element is permeable to aqueous alkaline treatment solutions and, hence, to the diffusible dyes. It essentially performs two functions. Firstly, it masks the image silver remaining in the originally photosensitive element after development and the dye-providing compounds remaining behind as color negative so that only the positive dye transfer image is visible through the transparent layer support of the photosensitive part. Secondly, it protects the photosensitive element on the side of the image-receiving layer against exposure to actinic radiation (downwards). This is particularly important when the monosheet material is intended to be brought into contact with the alkaline processing fluid in the camera after exposure, subsequently removed from the camera and developed outside the camera.

Layers with adequate impermeability to light but with adequate permeability to diffusible dyes may be produced for example with suspensions of inorganic or organic dark pigments, preferably black pigments, for example with suspensions of carbon black in suitable binders, for example in gelatin solutions. In general, 0.5 to 5$\mu$ thick layers containing from 10 to 90% by weight (based on the total dry weight) of carbon black in gelatin are sufficient for adequately shutting out light during development.

In addition to the black pigment layer, the light-impermeable layer preferably contains an underlying white pigment layer. The function of this white pigment layer is to cover the black layer and to provide a white back-ground for the image. Any white pigments may be used for the white layer providing their covering power is sufficiently high in reasonable layer thicknesses. Reference is made for example to barium sulfate, oxides of zinc, titanium, silicon, aluminum and zirconium, and also barium stearate or kaolin. Titanium dioxide is preferably used as the white pigment. The thickness of the white pigment layer may be varied according to the required whiteness of the background. Thicknesses of from 5 to 20$\mu$ are preferably used.

Instead of the light-impermeable layer, the monosheet material according to the present invention may also contain means for producing a light-impermeable layer between the photosensitive element and the image-receiving layer, for example in the form of a laterally arranged container accommodating a processing fluid containing an opacifier (pigment) which, under the action of mechanical forces, releases its contents between the above-mentioned layers so that a pigment layer of the type in question is formed.

The image-receiving layer consists essentially of a binder, which contains the dye mordant for anchoring the diffusible dyes.

Preferred mordants for acid dyes are long-chain quaternary ammonium or phosphonium compounds or ternary sulphonium compounds, for example those of the type described in U.S. Pat. Nos. 3,271,147 and 3,271,148. In addition, certain metal salts and their hydroxides which form substantially insoluble compounds with the acid dyes may also be used. The dye mordants are dispersed in a conventional hydrophilic binder in the receiving layer, for example in gelatin, polyvinyl pyrrolidone, completely or partially hydrolysed cellulose esters and the like. Some binders may of course also function as mordants, for example copolymers or polymer mixtures of vinyl alcohol and N-vinyl pyrrolidone, such as described for example in German Auslegeschrift No. 1,130,284, and also those which represent polymers of nitrogen-containing quaternary bases, for example polymers of N-methyl-2-vinyl pyridine, such as described for example in U.S. Pat. No. 2,484,430. A very useful mordant is, e.g. a crosslinked product of a mixture of gelatine and a cationic polyurethane containing glycidyl groups, such as described in German Offenlegungsschrift No. 2,631,521. Other suitable mordant binders are, for example, guanyl hydrazone derivatives of acyl styrene polymers such as described for example in German Offenlegungsschrift No. 2,009,498. In general, however, other binders, for example gelatin, will be added to mordant binders of this particular type.

Suitable transparent layer supports for the monosheet material according to the invention are any of the transparent supporting materials normally used in photography, for example films of cellulose esters, polyethylene terephthalate, polycarbonate or other film-forming polymers.

The alkaline processing composition adjusts a relatively high pH-value (in the range of from 11 to 14) in the photosensitive material, thereby initiating development and the imagewise diffusion of the dyes. For decreasing the pH-value after a certain time of development, and thereby terminating the development and diffusion of the image dyes, a neutralization system may be provided for in known manner.

Neutralisation systems, which are combinations of an acid polymer layer and a retarding layer, are described for example in German Pat. No. 1,285,310. Layer combinations such as these may be present in the material according to the invention, for example in the photosensitive part between the transparent layer support and the image-receiving layer. Another possibility is to arrange the neutralization system of an acid polymer layer and a retarding layer on the cover sheet. These two layers must of course be arranged in such an order that the alkali of the processing composition has first to penetrate through the retarding layer to reach the acid polymer layer.

The dye diffusion transfer process according to the invention may be carried out with advantage in or by means of a suitable self-developing camera. This camera may be provided for example with means for distributing a processing solution between the photosensitive element and the cover sheet after exposure of the photosensitive element and for masking the photosensitive material to prevent light passing through it from above. A camera of the type in question is preferably provided with two squeezing rollers mounted opposite one another and between which the monosheet material is withdrawn, thereby splitting open the laterally arranged container and causing its contents to be released between the layers of the monosheet material.

Since, after passing through the squeezing rollers, the photosensitive element is protected against undesirable exposure on both sides by light-impermeable layers, the exposed material may be removed from the camera immediately after development has commenced.

For processing the monosheet material exposed to form an image, the photosensitive element is brought into contact with the aqueous alkaline working solution. In this way, the silver halide emulsion layers exposed to form an image are developed in the presence of the developer compound, an imagewise distribution of oxidation products of the developer compound which oxidises the associated dye-providing compound being produced in consistency with the silver image formed, after which the dye-providing compound releases the diffusible dye by reaction with the alkali of the activator. The aqueous alkaline processing solution may contain viscosity-increasing additives, for example hydroxyethyl cellulose. In addition, the processing solution may contain in known manner development accelerators, stabilisers, silver salt solvents, fogging agents, antioxidants and other additives.

For further details of photographic recording materials suitable for the process according to the invention, reference is made for example to the Research Disclosure Publication No. 15162, November 1976.

PRACTICAL EXAMPLES

Example 1

A photosensitive element of a photographic material according to the invention was produced by successively applying the following layers to a transparent support of polyester film. The quantities indicated are each based on 1 square meter.

(1) A mordant layer of 6 g of a polyurethane of 4,4-diphenyl methane diisocyanate, N-ethyl diethanolamine and epichlorhydrin (prepared as described in example 1 of German Offenlegungsschrift 2,631,521) and 6.0 g of gelatin.
(2) A reflection layer of 24 g of TiO₂ and 2.4 g of gelatin.
(3) A carbon black layer of 1.9 g of carbon black and 2 g of gelatin.
(4) A dye layer of 0.5 g of compound 7 (cyan) and 0.9 g of gelatin.
(5) A red-sensitised emulsion layer containing a non-fogged direct-positive silver chloride bromide emulsion containing 1.3 g of gelatin and 40 mg of compound L (fogging agent), silver covering 2.6 g.
(6) A barrier layer of 0.5 g of octadecyl hydroquinone sulphonic acid and 1.3 g of gelatin.
(7) A dye layer of 1 g of compound 1 (magneta) and 1 g of gelatin.
(8) a green-sensitised emulsion layer containing a non-fogged direct-positive silver chloride bromide emulsion containing 1.28 g of gelatin and 40 mg of compound L, silver covering 2.5 g.
(9) A barrier layer identical with layer 6).
(10) A dye layer of 1.0 g of compound M (yellow) and 1.0 g of gelatin.
(11) A blue-sensitive emulsion layer containing a non-fogged direct-positive silver chloride bromide emulsion containing 1.4 g of gelatin and 40 mg of compound L, silver covering 2.7 g.
(12) A protective layer of 0.8 g of gelatin and 0.8 g of a compound corresponding to the following formula (hardener):

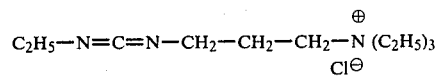

(13) A transparent cover sheet of polyethylene terephthalate with a neutralisation layer and a retarding layer.

After exposure through a step wedge, the photosensitive element is covered with the transparent cover sheet on the layer side. A breakable container filled with an alkaline working fluid of the following composition was used for developing the photosensitive element exposed to form an image:

70 g of KOH
10 ml of benzyl alcohol
3 g of benzotriazole
1 g of sodium sulphite
6.0 g of 1-phenyl-4-methyl-4-hydroxymethyl-3-pyrazolidone
0.1 g of hydroquinone
40.0 g of Natrosol HHR 250 (hydroxyethyl cellulose)
made up with water to 1000 ml.

The image set was passed through a pair of squeezing rollers, the developer paste being spread between the photosensitive element and the cover sheet. The paste layer was 110μ thick. In order to adjust this thickness, spacer strips of corresponding thickness were arranged laterally along the edge of the image between the photosensitive element and the cover sheet.

After a development time of 10 minutes, a direct-positive multicolor reproduction of the original with excellent color brilliance and fastness to light was obtained.

Similar results are obtained if compound 7 in layer 4 is replaced by compound 8 and/or if compound 1 in layer 7 is replaced by compounds 11, 13, 15 or 18.

Formula Appendix to Example 1

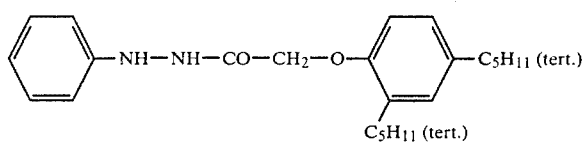

L

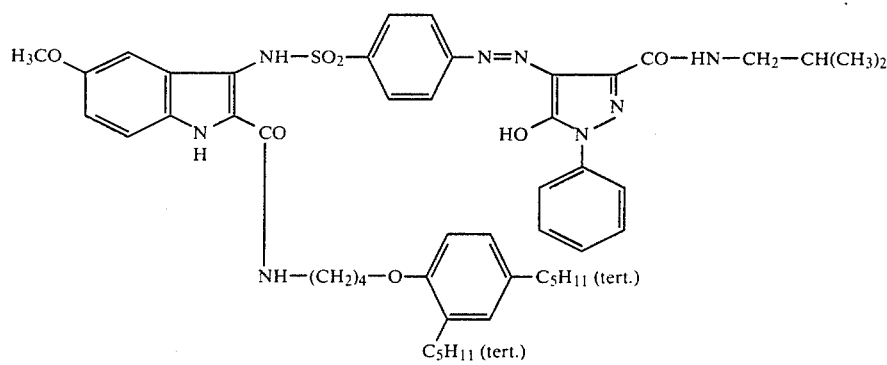

M

EXAMPLE 2

Determination of absorption data and fastness to light.

Test strips of a mordant layer consisting of 5 g of gelatin and 5.7 g of a polyurethane of 4,4'-diphenyl diisocyanate, N-ethyl diethanolamine and epichlorhydrin (according to Example 1 of German Offenlegungsschrift 2.6 31.521) per square meter on a transparent support of polyethylene terephthalate were immersed in a 0.01 molar aqueous alkaline solution of the "released" dyes until a color density of from 1 to 1.5 was obtained. The test strips were then rinsed with water for 10 minutes and dried.

The "released" dyes used are dyes corresponding to general formula (II), i.e. dyes which, instead of the oxidizable carrier radical originally present, only contain a small part thereof, optionally linked through a bridging member X, in the present case an $-SO_2-NH_2-$ group.

A portion of the test strip was used for recording the absorption spectrum. In addition to the absorption maximum in nm, the width at half of maximum intensity (WHI) is indicated, being the width of the absorption curve in nm, as measured at half the absorption maximum.

Another portion of the test strip was exposed for 24 hours in a Xeno tester, corresponding to a total exposure of $3.6 \times 10^6$ Lux·h. The percentage residual density was calculated from the color density values Do before and D after exposure as a measure of fastness to light (FL) in accordance with the following equation:

$$D/D_o \cdot 100 = \% \text{ residual density}$$

TABLE

| No. | $R^{11}$ | $R^{21}$ | $R^{31}$ | $R^{41}$ | $R^{51}$ | $R^{61}$ | λmax/WHI [nm] | FL residual density [%] |
|---|---|---|---|---|---|---|---|---|
| 1 | H | $SO_2NH_2$ | H | H | H | H | 538/99 | 50 |
| 2 | H | $-SO_2NH-\!\!\bigcirc\!\!-SO_2NH_2$ | H | H | H | $-COCH_3$ | 540/95 | 70 |
| 3 | H | H | $-SO_2NH_2$ | H | H | $-COCH_3$ | 540/110 | 69 |
| 4 | H | $-SO_2NH_2$ | $-CH_3$ | H | H | $-COCH_3$ | 539/90 | 40 |
| 5 | $-OCH_3$ | H | H | $-SO_2NH_2$ | H | $-COCH_3$ | 547/100 | 45 |
| 6 | $-Cl$ | H | H | $-SO_2NH_2$ | H | $-COCH_3$ | 545/102 | 62 |
| 7 | H | $-SO_2NH_2$ | $-OCH_3$ | H | H | $-COCH_3$ | 535/96 | 45 |
| 8 | $-CH_3$ | H | H | $-NH\!\!-\!\!\bigcirc\!\!-SO_2NH_2$ | H | $-COCH_3$ | 540/101 | 50 |
| 9 | $-CH_3$ | H | H | H | H | $-COCH_3$ | 540/98 | 60 |
| 10 | $-CH_3$ | H | $-SO_2NH_2$ | $-SO_2NH_2$ | H | $-COCH_3$ | 540/114 | 70 |
| 11 | $-CH_3$ | H | $-SO_2-NH\!\!-\!\!\bigcirc\!\!-SO_2NH_2$ | $-SO_2NH_2$ | H | $-COCH_3$ | 550/104 | 70 |
| 12 | $-CH_3$ | H | $-SO_2NH_2$ | H | Cl | $-COCH_3$ | 523/102 | 85 |
| 13 | $-CH_3$ | H | $-SO_2-NH\!\!-\!\!\bigcirc\!\!-SO_2NH_2$ | H | Cl | $-COCH_3$ | 522/103 | 90 |
| 14 | $-CH_3$ | H | $-CH_3$ | $-SO_2NH_2$ | H | $-COCH_3$ | 538/99 | 42 |
| 15 | $-CH_3$ | H | $-CH_3$ | $-SO_2NH\!\!-\!\!\bigcirc\!\!-SO_2NH_2$ | H | $-COCH_3$ | 538/98 | 53 |
| 16 | H | $-CH_3$ | $-SO_2NH_2$ | H | H | $-COCH_3$ | 547/102 | 60 |

TABLE-continued
| No. | | | | | | | |
|---|---|---|---|---|---|---|---|
| 17 | H | —CH₃ |  (—SO₂NH—Ph-SO₂NH₂) | H | —COCH₃ | 547/100 | 70 |
| 18 | —Cl | H | 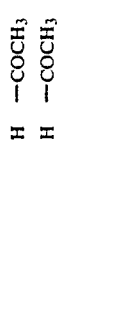 (—SO₂NH—Ph-SO₂NH₂) | H | —COCH₃ | 564/110 | — |
| 19 | H | —SO₂NH₂ |  (—SO₂NH—Ph-SO₂NH₂) | Cl | —COCH₃ | 552/91 | 60 |
| 20 | H | —SO₂NH | | Cl | —COCH₃ | 550/98 | 62 |
| 21 | H | —SO₂NH₂ | | H | —COOC₂H₅ | 532/103 | 55 |
| 22 | H | —SO₂NH₂ | | H | —COC(CH₃)₃ | 536/96 | 67 |
| 23 | H | H | —SO₂NH₂ | H | —COC(CH₃)₃ | 545/104 | 75 |
| 24 | H | Cl | | H | —CO—(Ph-SO₂NH₂) | 538/98 | 35 |
| 25 | Cl | H | | H | —CO—(Ph-SO₂NH₂) | 540/102 | 35 |
| 26 | Cl | H | | Cl | —CO—(Ph-SO₂NH₂) | 547/115 | 50 |
| 27 | H | H |  (—SO₂NH—Ph-SO₂NH₂) | H | —CO—CH₃ | 540/94 | 65 |
| 28 | H | H |  (—SO₂—NH—Ph(CH₃)(SO₂NH₂)) | H | —CO—CH₃ | 540/94 | 65 |

TABLE-continued

| No. | | | Aryl | | | | |
|---|---|---|---|---|---|---|---|
| 29 | H | —SO$_2$—NH—[phenyl with SO$_2$NH$_2$] | H | H | —CO—CH$_3$ | 540/95 | 70 |
| 30 | H | —SO$_2$—NH—[phenyl with H$_3$CO, SO$_2$NH$_2$] | —SO$_2$NH$_2$ | H | —SO$_2$—CH$_3$ | 542/96 | 55 |
| 31 | H | H | H | H | —SO$_2$—CH$_3$ | 545/108 | 67 |
| 32 | H | —SO$_2$—NH—[phenyl with H$_3$C, SO$_2$NH$_2$] | H | H | —COCH$_3$ | 543/95 | 63 |
| 33 | H | —SO$_2$—NH—[phenyl with Cl, SO$_2$NH$_2$] | H | H | —COCH$_3$ | 538/93 | 61 |
| 34 | H | —SO$_2$—NH—[phenyl with SO$_2$NH$_2$] | H | H | —COOC$_2$H$_5$ | 536/98 | 70 |
| 35 | H | —SO$_2$NH—[phenyl with SO$_2$NH$_2$] | H | H | —COC(CH$_3$)$_3$ | 533/94 | 80 |
| 36 | H | —SO$_2$NH—[phenyl with SO$_2$NH$_2$, OCH$_3$] | H | H | —COOC$_2$H$_5$ | 536/98 | 65 |
| 37 | H | —SO$_2$NH$_2$ | —OCH$_3$ | H | —COCH$_2$—NH—SO$_2$CH$_3$ | 543/98 | 55 |
| 38 | H | —SO$_2$NH$_2$ | H | H | —COOC$_2$H$_5$ | 527/101 | 75 |
| 39 | H | —SO$_2$NH—[phenyl with SO$_2$, H$_3$CO] | H | H | —CO—C(CH$_3$)$_3$ | 539/95 | 75 |
| 40 | H | —SO$_2$NH—[phenyl with SO$_2$NH$_2$, H$_3$CO] | —OCH$_3$ | H | —COOC$_2$H$_5$ | 530/100 | 75 |
| 41 | H | —SO$_2$NH$_2$ | H | H | —COCH$_2$—OC$_2$H$_5$ | 539/45 | |
| 42 | —SO$_2$NH$_2$ | H [phenyl with SO$_2$NH$_2$, CH$_3$O] | H | H | —COCH$_3$ | 530/45 | |

TABLE-continued

| No. | | Aryl | | | | | |
|---|---|---|---|---|---|---|---|
| 43 | H | —SO₂NH— ⌬ —SO₂NH₂ | H | H | —CO—CH₂—OC₂H₅ | 540/65 | |
| 44 | H | —SO₂NH— ⌬ —SO₂NH₂ | —CH₃ | H | —COOCH₃ | 535/50 | |
| 45 | H | | H | H | —COCH₃ | 540/55 | |
| 46 | H | —SO₂NH— ⌬(H₃CO) —SO₂NH₂ | H | H | —COCH₂—OC₂H₅ | 539/96 | 65 |
| 47 | H | —SO₂— ⌬(CH₃O) —SO₂NH₂ | H | H | —COCH₃ | 538/94 | 55 |
| 48 | H | —SO₂NH— ⌬ —SO₂NH₂ (Cl) | H | H | —COOCH₃ | 541/97 | 58 |
| 49 | H | —SO₂NH— ⌬(H₃CO) —SO₂NH₂ | H | H | —COOCH₃ | 540/97 | 60 |
| 50 | H | —SO₂NH— ⌬ —SO₂NH₂ (NHC(=O)CH₃) | H | H | —C(=O)—CH₃ | 537/102 | 63 |
| 51 | H | —SO₂NH— ⌬(OCH₃) —SO₂NH₂ (NH—C(=O)CH₃) | H | H | —C(=O)—CH₃ | 540/98 | 61 |

TABLE-continued

| No. | | | | | max/WHI [nm] | FL residual density [%] |
|---|---|---|---|---|---|---|
| 52 | H | -SO$_2$NH-(phenyl with SO$_2$NH$_2$) | H | H  -C(=O)-CH$_3$ | 538/100 | 59 |
| 53 | H | -SO$_2$-NH-CH$_2$-CH$_2$-SO$_2$-NH$_2$ | H | H  -COOC$_2$H$_5$ | | |

-SO$_2$NH-C(CH$_3$)$_3$

[Structure: naphthalene bearing azo-phenyl group with substituents $R^{11}$, $R^{21}$, $R^{31}$, $R^{41}$, $R^{51}$, and NH-$R^{61}$]

| No. | $R^{11}$ | $R^{21}$ | $R^{31}$ | $R^{41}$ | $R^{51}$ | $R^{61}$ | max/WHI [nm] | FL residual density [%] |
|---|---|---|---|---|---|---|---|---|
| 54 | H | H | -SO$_2$NH$_2$ | H | H | COCH$_3$ | 530/99 | 45 |
| 55 | H | -SO$_2$NH$_2$ | H | H | Cl | COCH$_3$ | 539/100 | 45 |
| 56 | H | H | -SO$_2$NH$_2$ | H | H | SO$_2$CH$_3$ | 545/95 | 45 |

EXAMPLE 3

The spectral properties and fastness to light of the dyes "released" from dye-giving compounds 7 and 8 were determined in the same way as in Example 2. A "released" dye corresponding to German Offenlegungsschrift No. 2,406,653 was used for comparison.

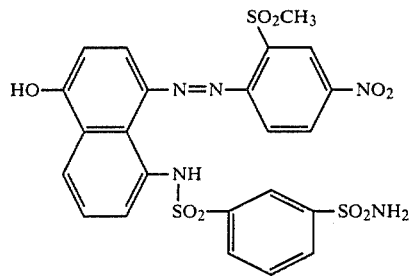

The results are set out in the following Table:

Table

| Dye "released" from | λmax/WHI (nm) | FL residual density (%) |
|---|---|---|
| Compound 7 | 650/120 | 75 |
| Compound 8 | 660/105 | 65 |
| Comparison | 645/100 | 25 |

We claim:

1. In a photographic dye diffusion transfer process for the production of coloured images, in which a photographic material comprising at least one photosensitive silver halide emulsion layer and, associated therewith, a non-diffusible dye-providing compound is exposed imagewise, developed under alkaline conditions with a silver halide developer, a diffusible dye being released imagewise from the non-diffusible dye-providing compound under the alkaline development conditions of the developer and being transferred to an image-receiving layer and thereafter neutralizing the alkaline condition thereby terminating development and diffusion of the dye, the improvement according to which the non-diffusible dye-providing compound is a compound corresponding to the following formula:

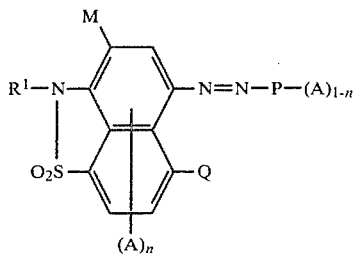

in which

A represents an oxidizable organic carrier radical attached to the remainder of the formula optionally through a connecting link X and containing a diffusion-preventing radical, of which carrier radical either in its oxidized form or in its non-oxidized form at least a part thereof is split off together with the diffusion-preventing radical under the alkaline photographic development conditions, accompanied by the imagewise release of a diffusible azo dye, n=0 or 1, P represents a monocyclic carbocyclic aromatic or heterocyclic aromatic radical, M represents hydrogen, halogen, alkyl sulfonyl, aryl sulfonyl, or sulphamoyl, Q represents acylamino, the acyl radical being derived from aliphatic or aromatic carboxylic or sulphonic acids, $R^1$ represents hydrogen or a hydrolysable radical corresponding to one of the formulae —CO—$R^2$ or —CO—$OR^2$, and $R^2$ represents alkyl containing from 1 to 18 carbon atoms or phenyl.

2. A process as claimed in claim 1, in which the non-diffusible dye-providing compound used is a compound corresponding to one of the following formulae:

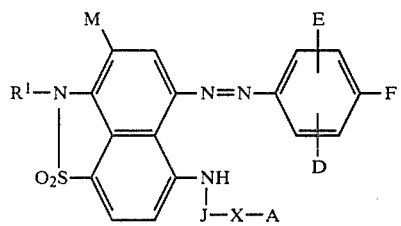

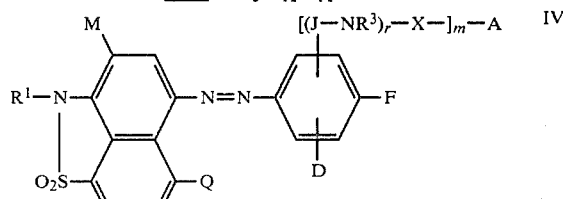

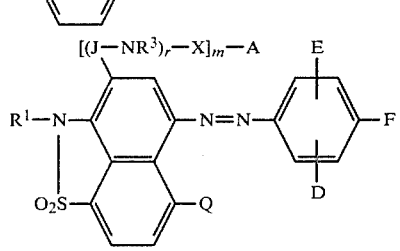

in which, A, M, Q and $R^1$ are as defined in claim 1 and in which

D, E are the same or different and represent hydrogen, halogen, cyano, nitro, trifluoromethyl, alkyl, alkoxy or sulfamoyl, F represents hydrogen, alkyl, alkoxy, halogen, nitro or sulfamoyl, J represents —$SO_2$— or —CO—, $R^3$ represents hydrogen or alkyl containing from 1 to 6 carbon atoms, X represents a divalent connecting link of the formula —$R^4$—(L)$_p$—($R^4$)$_q$— where $R^4$ is an alkylene radical containing from 1 to 6 carbon atoms or an optionally substituted phenylene radical, the two radicals $R^4$ being the same or different, L represents —O—, —CO—, —$CONR^5$—, —$SO_2$—$NR^5$—, —$SO_2$—, —SO— or —S— ($R^5$=H or alkyl), m, p, q, r=0 or 1; and q=1 when p=1.

* * * * *